United States Patent Office 3,321,456
Patented May 23, 1967

3,321,456
POLYOLEFIN COMPOSITIONS
Harry Braus, Springdale, and Fred D. Waas, Columbus, Ohio, assignors to National Distillers and Chemical Corporation, New York, N.Y., a corporation of Virginia
No Drawing. Filed Dec. 5, 1963, Ser. No. 328,211
8 Claims. (Cl. 260—94.9)

This invention relates to additives for polyolefins and, more particularly, to anti-static agents for polyethylene and polypropylene.

Static charges on plastic materials have long been a problem. The charges accumulate on the plastic object, for example, polyolefin film or molded polyolefin, and remain there until discharged. These static charges give rise to many serious difficulties, foremost among which is the collection of dust. Not only does the dust make the product unattractive aesthetically, but also it results in practical problems, as when, for example, the plastic article is used as part of mechanical or electrical equipment. Another important problem involves handling of the polyolefin film, that is, when static charges are present, film clings to rolls.

With the rapidly increasing use of polyolefins as containers for foods, drugs, cosmetics, bleaches, and so forth, it has become necessary that polyolefins be made as nearly static-free as possible without deleterious effect on the other properties of the polyolefins that make them particularly useful as containers. This means that when anti-static properties are added the product should retain its slip and anti-blocking characteristics; its optical properties, particularly gloss and clarity; and its non-toxicity. In addition, by eliminating static build-up, downtime and product loss are reduced, the danger of fire or explosion is decreased, the product remains clean longer, and the amount of cleaning required is minimized.

It is an object of this invention to provide a means of making polyolefins substantially non-susceptible to the accumulation of electrostatic charges.

Another object is to provide polyolefins that are resistant to the build-up of static charges on the surface thereof over long periods of time.

A further object is to effect the destaticization of polyolefins with materials that can be added in extremely small amounts.

Additional objects and advantages will be apparent from the following detailed description.

In addition to having no adverse effect on the slip, block, and optical characteristics, an anti-static agent should be non-toxic, compatible with the polymer that it is being used to treat, and possess an abundance of polar groups.

It has now been found that a fatty acid salt of ammonia or of an alkanolamine, prepared by the reaction of a fatty acid with ammonia or an alkanolamine, is compatible with polyolefins and that small amounts of such a compound or mixture of compounds are effective in imparting anti-static properties to a polyolefin.

In general the anti-static agent of this invention can be any compound of the general structure

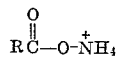

or

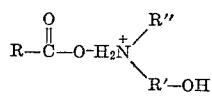

wherein R is an alkyl radical having from about 7 to about 23 carbon atoms; R' is a saturated aliphatic hydrocarbon diradical having from about 2 to about 6 carbon atoms; and R" is hydrogen, an alkylol radical having from 2 to about 6 carbon atoms, or a saturated aliphatic hydrocarbon radical having from 1 to about 6 carbon atoms.

Suitable fatty acids are those containing from about 8 to about 24 carbon atoms and preferably from 12 to 20 carbon atoms; examples of suitable fatty acids include caprylic, capric, lauric, palmitoleic, stearic, oleic, arachidic, behenic, erucic, and the like, and mixtures thereof. Stearic acid and lauric acid are preferred.

The alkanolamine with which the fatty acid is reacted can be any compound having the general structure

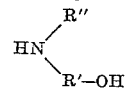

wherein R' is a saturated aliphatic hydrocarbon diradical having from about 2 to about 6 carbon atoms and R" is hydrogen, an alkylol radical having from 2 to 6 carbon atoms, or a saturated aliphatic hydrocarbon radical having from 1 to about 6 carbon atoms. Suitable alkanolamines include monoethanolamine, diethanolamine, diisopropanolamine, monohexanolamine, N-propyl-N-(B-hydroxyethyl)amine, N-methyl-N-(γ-hydroxypropyl)amine, and the like, and mixtures thereof. Compounds in which R" is hydrogen or an alkylol radical are preferred, e.g., monoethanolamine and diethanolamine.

Ammonium salts of fatty acids are readily available commerically. Alkanolamine salts of fatty acids can be conveniently prepared by heating together equimolar quantities of a fatty acid and an alkanolamine. In carrying out the reaction the fatty acid is placed in a suitable reaction vessel and heated until it becomes molten. The alkanolamine is then introduced gradually with stirring. Completion of the reaction is assured by heating the reaction mass, after addition of the alkanolamine has been completed, to a temperature at which a homogeneous melt is obtained; temperatures higher than this should be avoided in order to prevent the occurrence of undesired amidation.

Examples of ammonium and alkanolamine salts of fatty acids suitable as anti-static agents include ammonium stearate, ammonium laurate, ammonium oleate, ammonium behenate, ethanolamine laurate, diethanolamine laurate, ethanolamine stearate, diethanolamine stearate, ethanolamine erucate, diethanolamine erucate, dipropanolamine palmitate, N-propyl-N-(B-hydroxyethyl)amine behenate, N-methyl-N-(γ-hydroxypropyl)amine oleate, and so forth, and mixtures of these.

These compounds have been found to be satisfactory anti-static agents when combined with a polyolefin in an amount ranging from about 0.1 to 1.5 parts per hundred parts by weight of the polyolefin. Within this range the amount of additive required to impart a satisfactory level of anti-static behavior to a polyolefin body or layer generally increases as the thickness of the polyolefin body or layer increases. For example, for a relatively thin layer of polyolefin, e.g., a polyolefin film, it is preferred to use from about 0.10 to about 0.15 part of additive per hundred parts of polyolefin. For a relatively thick layer of polyolefin, e.g., that which generally constitutes the walls of a blown bottle, it is preferred to use from about 0.5 to about 1.0 part of additive per hundred parts of polyolefin.

The compositions may be prepared by any method that is suitable for insuring a uniform mixture of the polyolefin and the anti-static agent. Suitable methods include the addition of the additive compound as a solid, in solution in inert solvents, or as a slurry in water or in other non-solvents to the polyolefin which may be in the form of either dry fluff or molding powder, followed by drying and tumbling the mixture. The additive also can be incorporated into the polyolefin by melt blending the ingredients in conventional apparatus, such as a Banbury mixer, heated rolls, or a plasticator. It is also possible to prepare a concentrate of the additive in the polyolefin by one of the aforesaid methods; this concentrate then can be blended with polyolefin molding powder by tumbling, Banbury mixing, or other suitable means. In addition, various combinations of the above methods can also be used.

The polyolefin compositions that have been destaticized by the compounds of this invention are particularly useful for fabrication by extrusion into thin films, sheets, blown bottles, blown tubing, and the like. The compositions may also be cast or molded into films, sheets, rods, tubes, piping, filaments, and other shaped articles. In addition the compositions may be used for coating paper, cloth, wire, metal foil, glass fiber mats, synthetic and natural textiles, and other substrates.

In addition to the anti-static additives disclosed herein, the polyolefin compositions may be compounded with small amounts of other additives, such as high melting waxes, anti-oxidants, dyes and pigments, lubricants, and the like, provided that the additional ingredients are not present in amounts sufficient to alter substantially the effectiveness of the agents employed to inhibit the accumulation of static charges.

The invention will be more fully understood by reference to the following examples which are not intended to limit the scope of the invention except as indicated by the appended claims. Unless otherwise specified, all parts are given by weight.

FILM PREPARATION

The additive was dry-blended with the polyolefin in powder form. The resulting blend was then fed into a 1¼-inch Egan extruder and extrusion-blown into 0.5- to 1-mil tubular film at extrusion temperatures ranging from about 275° to 350° F.

FILM TESTING

*Cigarette ash test.*—A piece of film 6″ x 12″ was rubbed 10 times with a wool cloth. The film was then brought down slowly toward a fresh mound of cigarette ashes. At som finite height a sudden and rapid pick-up of ashes occurred to films retaining a static charge. This height was recorded in inches. It varied directly with the intensity of charge on the film, qualitative values being assigned as follows:

*Table 1*

| Effectiveness of additive: | Distance at which rapid ash pick-up occurs, inches |
|---|---|
| Good | <1 |
| Fair | 1 to 4 |
| Poor | >4 |

BOTTLE PREPARATION

A concentrate of the additive in polyolefin was prepared by dry blending the polyolefin in power form with 25 weight percent of the additive. This dry blend was then incorporated into the main portion of the polyolefin in a quantity that would yield the final desired level of antistatic agent. Incorporation was achieved by Banbury mixing at 280° F. for 7 to 8 minutes. The resulting homogeneous blend was granulated, fed into a 1¼-inch Egan extruder, and then extrusion-blow molded at a parison temperature of 375° to 385° F. and a mold temperature of 50° to 60° F. into 12-ounce rectangular bottles weighing 28 grams each. These bottles were conditioned for testing by placing them in a constant temperature and humidity room for 24 hours.

BOTTLE TESTING

The level of anti-static behaviour was evaluated by the Static Decay Test and the Soot Chamber Test. The former was employed primarily to measure the initial level of static charge and the rate of charge dissipation over a 24-hour storage period. It was found that effective additives generally showed lower initial voltage and rapidly decay until essentially no charge was remaining after 24 hours. The Soot Chamber Test was used to measure directly the ultimate level of static charge achieved. Generally a value of zero in the Static Decay Test corresponded to a value of "slight" to "none" in the Soot Chamber Test.

(A) *Static decay test.*—A blown bottle was rubbed 10 times with a fresh paper towel and allowed to stand in 50 percent relative humidity for 24 hours. The surface of the bottle was tested at the beginning and at the end of this period for the amount of static charge remaining by means of an electrostatic voltmeter (Custom Scientific Instruments Model CS66 Electrostatic Voltmeter).

(B) *Soot chamber test.*—A blown bottle was rubbed 10 times with a fresh paper towel and allowed to stand in a soot chamber for 24 hours. At the end of this period soot produced from the burning of toluene-saturated filter paper in a separate combustion chamber was circulated around the bottle for 15 minutes. The bottle was then checked visually for soot deposition and assigned a value of "heavy," "medium," "slight," or "none."

A number of fatty acid salts were prepared, compounded with conventional polyethylene and formed into films, and compounded with linear polyethylene and formed into bottles. Test results on the films and bottles prepared from polyethylene containing an anti-static agent are presented in Table 2 along with comparative results for films and bottles prepared from polyethylene containing no anti-static agent.

*Table 2*

| Example | Additive | Resin | Blend Percent Additive | Blend Form Tested | Test | Evaluation Value and Rating |
|---|---|---|---|---|---|---|
| (a) | None | Polyethylene (density, 0.922; melt index, 9.1). | | Brown Film | (b) | 5-9, Poor. |
| I | Diethanolamine Laurate | do | 0.15 | do | (b) | 0, Good. |
| II | Ethanolamine Laurate | do | 0.15 | do | (b) | Do. |
| III | Diethanolamine Stearate | do | 0.15 | do | (b) | Do. |
| IV | Ethanolamine Stearate | do | 0.15 | do | (b) | Do. |
| V | Ammonium Stearate | do | 0.15 | do | (b) | 3-4, Fair. |
| (c) | None | Linear Polyethylene (density, 0.960; melt index, 6.0). | 1.0 | Blown Bottle | (d) | Initial: 140,000; final: 120,000. |
| | | | | | (e) | Heavy. |
| VI | Ethanolamine Stearate | do | 1.0 | do | (d) | Initial: 80,000; final: 36,000. |
| | | | | | (e) | Medium. |

(a) Film Control.
(b) Cigarette Ash Test.
(c) Bottle Control.
(d) Static Decay Test.
(e) Soot Chamber Test.

EXAMPLE VII 1.0 part of ethanolamine stearate was incorporated into polypropylene (density 0.905, melt flow rate at 230° C. 5.0), and the resulting composition was formed into blown bottles. The Soot Chamber Test gave a value of "medium" as compared to a value of "heavy" for the same polypropylene without an anti-static agent.

While there are above disclosed but a limited number of embodiments of the process of the invention herein presented, it is possible to produce still other embodiments without departing from the inventive concept herein disclosed. It is desired, therefore, that only such limitations be imposed on the appended claims as are stated therein.

What is claimed is:

1. A composition comprising a polyolefin and an anti-static agent, said anti-static agent being a member of the group consisting of compounds having the general structures

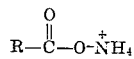

and

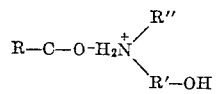

wherein R is an alkyl radical having from about 7 to about 23 carbon atoms; R' is a saturated aliphatic hydrocarbon diradical having from about 2 to about 6 carbon atoms; and R" is a member of the group consisting of hydrogen, an alkylol radical having from 2 to about 6 carbon atoms, and a saturated aliphatic hydrocarbon radical having from 1 to about 6 carbon atoms.

2. The composition of claim 1 wherein the polyolefin is polyethylene.

3. The composition of claim 1 wherein the polyolefin is polypropylene.

4. The composition of claim 1 wherein the amount of anti-static agent is in the range of about 0.1 to 1.5 parts per 100 parts by weight of the polyolefin.

5. The composition of claim 1 wherein the anti-static agent is a stearate.

6. The composition of claim 1 wherein the anti-static agent a laurate.

7. The compositon of claim 1 wherein the anti-static agent is ethanolamine stearate.

8. A composition comprising a polyolefin and ammonium stearate as an anti-static agent.

References Cited by the Examiner

UNITED STATES PATENTS 2,640,817  6/1953  Sheridan et al. _____ 260—32.6
3,123,632  3/1964  Katzschmann _____ 260—404

OTHER REFERENCES

Mason Hayek, "Antistatic Finishes for Textiles," 6–1954.

JOSEPH L. SCHOFER, *Primary Examiner.*

LAWRENCE EDELMAN, *Assistant Examiner.*